April 2, 1935.  E. WERTHNER  1,996,184
KEG TAPPING SEAL
Filed Dec. 8, 1933
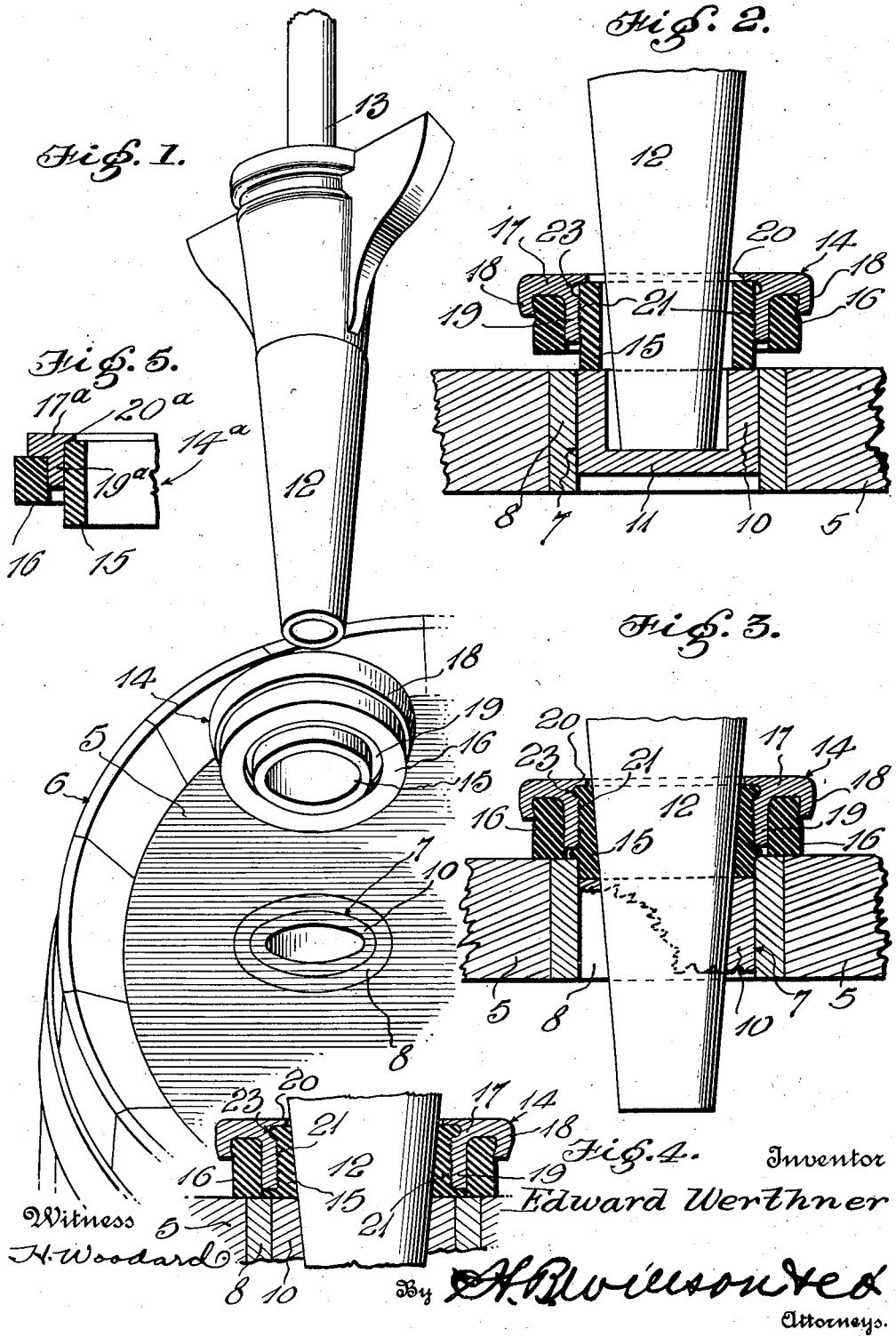

Patented Apr. 2, 1935

1,996,184

UNITED STATES PATENT OFFICE 1,996,184

KEG TAPPING SEAL

Edward Werthner, New York, N. Y., assignor to William Werthner, New York, N. Y.

Application December 8, 1933, Serial No. 701,527

4 Claims. (Cl. 225—44)

The usual beer keg is commonly provided with a cupped wooden bung and the dispensing means for discharging the beer as needed, includes a tapered tap to be driven into the cupped bung to break out the bung bottom and then wedge fluid-tightly into the bung side wall, said tap carrying the usual faucet tube or "rod". It often happens, however, that the side wall of the bung instead of remaining intact in the bung hole, breaks and will not fluid-tightly seal around the tap, or that the bung is driven completely into the keg. When such occurrences happen, not only does the keg-tapping person become showered with leaking beer squirting under pressure from the keg, but the gas from the beer is lost and the beer soon spoils. It is the object of my invention, however, to overcome such difficulties.

With the foregoing in view, the invention resides in the novel subject matter hereinafter described and claimed, description being accomplished by reference to the accompanying drawing.

Fig. 1 is a perspective view showing one form of the seal, the tap to be driven through said seal, and a portion of an unopened beer keg to be tapped.

Fig. 2 is a vertical sectional view showing the manner of positioning the seal before inwardly driving the tap to break out the bung bottom.

Fig. 3 is a view similar to Fig. 2 but showing the relation of parts when the tap has been driven completely into place, if part of the bung side wall has been driven inwardly, broken and entered the keg with the bung bottom.

Fig. 4 is a sectional view showing the manner in which the seal operates when only the bung bottom is broken out by driving of the tap.

Fig. 5 is a detail sectional view showing a modification.

Two seals of advantageous construction have been shown and will be specifically described, with the understanding however, that the invention could well be practiced with seals of other formations. The seal cooperates with certain old parts, briefly described below.

One head 5 of the usual beer keg 6 is provided with a bung hole 7 formed in a metal bushing 8. Into this bung hole, the conventional cupped wooden bung is tightly driven at the brewery. The side wall of this bung is denoted at 10 and its bottom at 11, for further reference.

The usual tapered tap 12 which has a packed sliding connection with the faucet tube or "rod" 13, is intended to be driven into the cupped bung to first break out the bung bottom 11 and to then wedge fluid-tightly into the side wall 10. If a portion of this side wall, however, breaks off and enters the keg, or if the entire bung should be driven from the bung hole, it is ordinarily impossible to tightly seal the tap 12 in place, making leakage, loss of beer and beer spoiling inevitable, but no such occurrences can take place when the present invention is practiced during keg tapping. The bung is customarily flush with the outer end of the bushing 8, and I provide for a fluid-tight seal between the tap 12 and the outer ends of said bushing and bung, and moreover, a fluid-tight seal is established even if the side wall 10 of the bung should badly break as illustrated in Fig. 3, or should be driven entirely into the keg.

The invention is practiced with the aid of a seal such as 14 or 14a which is to a large extent elastic. This seal ring is applied to the keg as seen in Fig. 2 with one of its elastic portions 15 disposed against the outer end of the bung side wall 10 and with another elastic portion 16 of said seal ring disposed in outwardly spaced relation with the part of the keg around the bung hole. The tap 12 is then inserted through the seal ring, positioned against the bung bottom 11, and inwardly driven to break said bottom off. If the side wall 10 breaks and the bung drives partly into the keg as seen in Fig. 3, the elastic portion 15 enters the bung hole 7, and as the tap 12 is further driven, it wedges tightly into said elastic portion 15 and expands the same tightly against the side wall of said bung hole 7, and the inward driving of the tap 12 also draws the elastic portion 16 tightly against the part of the keg surrounding the bung hole. The same will take place if the entire bung drives into the keg. If the bung side wall 10 does not break, the inward driving of the tap 12, merely compresses and distorts the elastic portion 15 against said wall 10 and the bushing 8, and also draws portion 16 against said bushing and the surrounding part of the head 5 as seen in Fig. 4. A fluid-tight seal will thus be effected around the tap 12, even under conditions which would ordinarily cause severe leakage with its accompanying inconveniences and losses.

Should it be desired, the invention may, of course, be practiced without forcing an elastic portion such as 16 against the part of the keg around the bung hole but when such a portion is used in addition to a portion such as 15, a seal is provided which is less apt to become impaired if any lateral stresses be placed upon the faucet tube or "rod" 13.

As to structure, the sealing ring 14 and 14a preferably comprises a metal ring and two rubber rings. The metal ring in Figs. 1 to 4, comprises a top wall 17 having two spaced concentric integral flanges 18 and 19, and an integral flange 20 projecting inwardly beyond the flange 19. This flange 19 is preferably of greater height than the flange 18, and it snugly embraces one of the rubber rings for which reference number 15, already used, will suffice. The upper end of this rubber ring 15 abuts the flange 20 and projects radially inward beyond this flange, and the flange 19 is preferably roughened, for instance, with fine screw threads 21, to engage said ring 15 and prevent it from being accidentally removed.

The second rubber ring, for which the reference number 16, already used, will suffice, is held between the flanges 18 and 19, flange 18 being preferably crimped inward to some extent to hold said ring 16 against removal. Ring 16 is preferably of greater radial width than ring 15 but is of shorter vertical dimension, with its lower side upwardly offset from the lower edge of said ring 15.

When the tap 12 is driven into place and the ring 15 is deformed as shown in Figs. 3 and 4, some of the upper portion of said ring 15 may well be received in a shallow channel 23 in the angle between the flanges 19 and 20, and this will assist also in holding ring 15 properly engaged with the metal ring. The lower deformed portion of this ring 15, "flows" into the space under flange 19.

In Fig. 5, the top wall 17a of the metal ring is provided only with two flanges 19a and 20a but this structure is nevertheless an effective seal.

Excellent results have been attained from the invention as herein disclosed, and the present disclosure may therefore be considered as preferred. However, within the scope of the invention as claimed, variations may of course be made.

I claim:—

1. A keg tap seal comprising an inherently rigid ring, and annular elastic sealing means coaxial with, carried by and projecting from one side of said rigid ring, said sealing means having one annular portion for compression against a bung or for reception in the outer end of a bung hole, and a second annular portion to lie against the portion of the keg around said bung hole, said one annular portion being throughout of less internal diameter than said rigid ring to fluid-tightly contact with the usual tapered tap when the latter is driven through the seal to break out the bottom of the usual bung.

2. In a keg tap seal, an inherently rigid ring having an annular top wall, and an annular flange projecting downwardly from said top wall between its inner and outer peripheral edges, and inner and outer elastic seal rings engaging the inner and outer sides of said flange respectively and abutting said top wall, said inner seal ring projecting downwardly beyond said outer seal ring.

3. In a keg tap seal, an inherently rigid ring having an annular top wall, and two spaced concentric flanges projecting downwardly from said top wall, said top wall having an annular flange portion projecting inwardly beyond the innermost of said concentric flanges; an inner elastic seal ring embraced by and projecting downwardly from said innermost of said concentric flanges, the upper edge of said inner seal ring abutting said flange portion of said top wall, and an outer elastic seal ring held between and projecting downwardly from said concentric flanges, said inner seal ring projecting downwardly below said outer seal ring.

4. In a keg tap seal, annular elastic sealing means having an outer annular elastic portion for compression against a keg around a cupped bung thereof, said sealing means also having a projecting inner tap-engaging elastic annular portion for compression against the outer end of the bung side wall whenever the latter remains in place during driving of the tap to break off the bung bottom, said inner tap-engaging portion being of a size to enter and seal the outer end of the bung hole if the bung side wall should drive partly or totally into the keg, said inner tap-engaging portion projecting an insufficient distance from said outer portion to prevent compression of the latter against the keg if said inner portion cannot enter the bung hole.

EDWARD WERTHNER.